United States Patent [19]
Jameson

[11] Patent Number: 5,499,492
[45] Date of Patent: Mar. 19, 1996

[54] LAWN MOWER CLEANING METHOD AND ATTACHMENT

[76] Inventor: Eddie A. Jameson, 501 Ledge Rd., Yarmouth, Me. 04096

[21] Appl. No.: 260,755
[22] Filed: Jun. 16, 1994

Related U.S. Application Data

[63] Continuation-in-part of Ser. No. 845,437, Mar. 5, 1992, Pat. No. Des. 350,357.
[51] Int. Cl.⁶ ..................................................... A01D 75/10
[52] U.S. Cl. ............................. 56/12.1; 56/17.5; 239/282; 239/DIG. 6
[58] Field of Search ..................................... 56/12.1, 17.5, 56/DIG. 9; 239/282, 283, 589, DIG. 6

[56] References Cited

U.S. PATENT DOCUMENTS 3,040,990   6/1962   Gotti ..................................... 56/12.1 X

FOREIGN PATENT DOCUMENTS 625488   8/1961   Canada ............................ 239/DIG. 6

Primary Examiner—David J. Bagnell

[57] ABSTRACT

A pulsating cleaning attachment is added to an existing rotary lawn mower, and is adapted to receive a hose for cleaning the mower blade and underside surface of the lawn mower carriage. An attachment body member of the attachment includes a first upward-directed water passage selected at an angle of about thirty degrees, which passage terminates in an elliptically-shaped opening on the inner surface of said body member. This passage both forms and directs a jet stream of water exiting therefrom into and from beneath a rotating blade tip of the mower, whereby the rotating blade cuts the jet stream and creates a pulsating cleaning action for the undercarriage, blade and skirt of the mower.

15 Claims, 4 Drawing Sheets

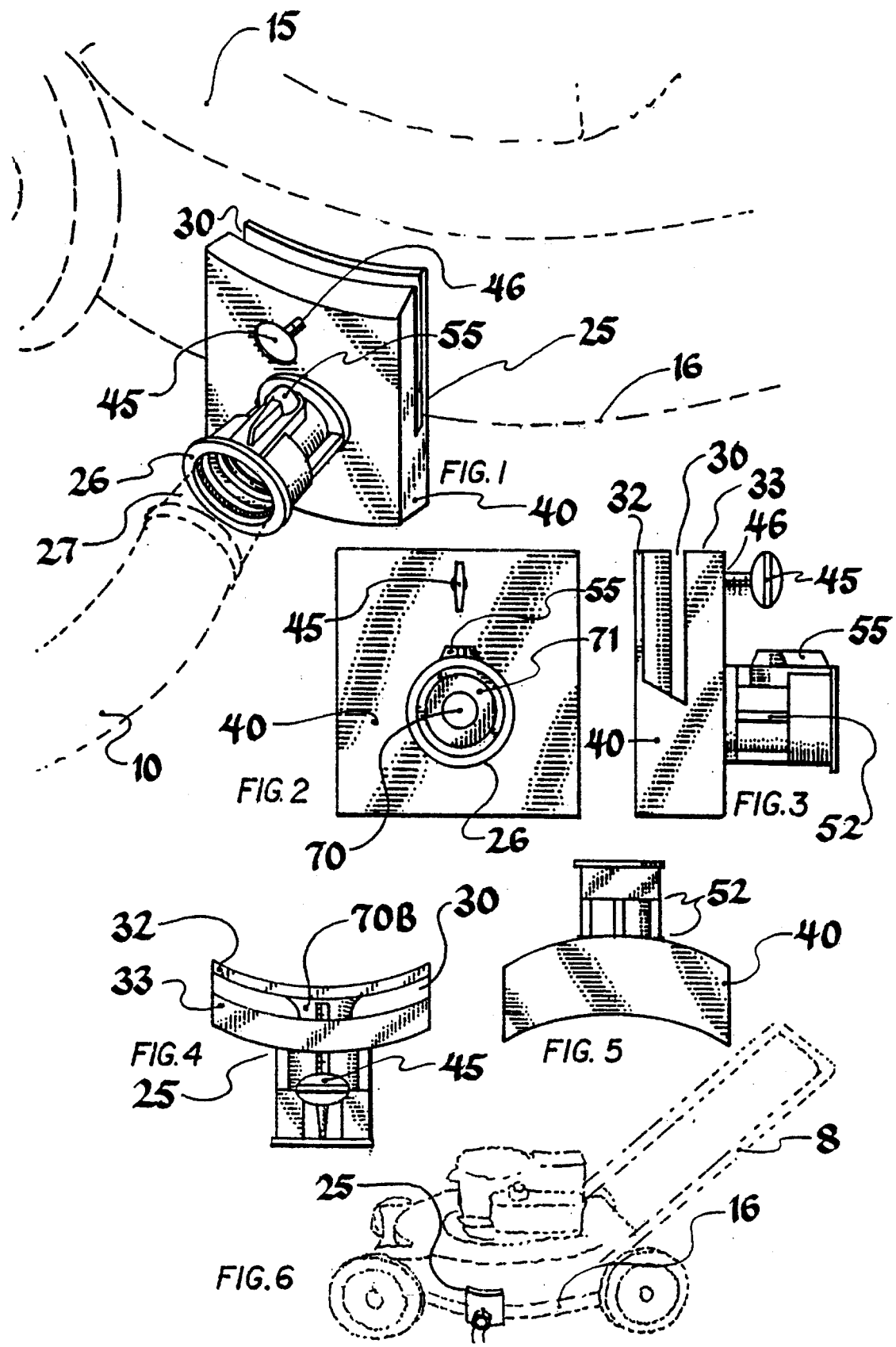

LAWN MOWER CLEANING METHOD AND ATTACHMENT

RELATED APPLICATIONS

This application is a continuation-in-part of an earlier-filed application by the same inventor entitled, as amended, "Lawn Mower Cleaning Attachment" filed on Mar. 5, 1992 and assigned Ser. No. 07/845,437 now issued as U.S. Pat. No. 0,350,357.

BACKGROUND OF THE INVENTION

1. Field of the Invention

This invention relates to gardening equipment such as lawn mowers.

More particularly, the invention relates to an attachment that is added to an existing rotary lawn mower, which attachment is adapted to receive a hose for cleaning the lawn mower blade and underside surface of the lawn mower blade carriage.

2. Description of Prior Art

A large percentage of people today own their own lawn mowers. That fact, coupled with a do-it-yourself attitude, causes home owners to do most of the cleaning and repair of their own gardening devices. Among such equipment, rotary lawn mowers—particularly the mulching type—are difficult to keep clean.

In the standard home-sized rotary lawn mower a motor is mounted atop a blade carriage that has a downward depending skirt that is open primarily at the bottom and at a clipping exit point in the skirt. That carriage, including the downward depending skirt, houses the mower's rotating blade and offers both user protection from thrown articles hit by the blade, and also serves to contain the clippings of cut grass and direct them to the clipping exit port.

During use, the underside of the carriage, skirt section, blade, bearing housing and clipping port, becomes caked with a glue-like mixture. This mixture is formed from moisture, grass juice, sap, grass particles and small-sized clippings. Unless removed, this mixture, seriously reduces operational efficiency, gums the blades rotational capability, corrodes and otherwise rusts the mower carriage, blade and related mower components.

This invention provides an easily installed attachment for the skirt of the mower carriage which provides a simple and convenient way of quickly cleaning the mower via a connection to a common garden hose. The attachment does not require any special adaptations to the mower, is easily installed and is safe and efficient in operation.

A search of the prior art has revealed that hose-fed mower cleaning devices, in general, are well known. Such devices generally admit water through a hose into the carriage at a location above the rotary blade. A typical device is described in U.S. Pat. No. 5,027,590 issued on Jul. 2, 1991 to Stark.

The Stark device discloses a front-mounted device that requires a hole to be drilled in the front of the depending skirt. Stark also discloses a quick disconnect as an easy way of attaching a garden hose to the cleaning port assembly. It is Stark's contention, in keeping with this prior art disclosure, that water from the hose should be shot directly into the carriage at a position above the rotary blade. That water then is deflected down on the upper surface of the blade, and the resulting spraying tends to wash the mower unit.

U.S. Pat. No. to Gotti, 3,040,990 and Blume 2,936,563 also teach use of water streams above the blade from either the side or back of the carriage, respectively. Gotti is a straight-edged device with a plurality of nozzles located above the blade and Blume requires a hole to be drilled in the side of the carriage skirt to receive a straight through barrel portion for attachment to a hose.

Other classes of related art devices and additional patents are described in the description of the Stark, Gotti and Blume patents. Most such art reveals that various configurations of mower cleaning approaches are complex, require mower adaptation and in general are not satisfactory for most home owners.

Typical of such configurations is the U.S. Pat. No. 3,535,862 to Wittwer, issued on Oct. 27, 1970. The Wittwer patent shows a top-mounted eye-cup connection seated through a hole in the top of a mower casing for receiving a pressure nozzle from a garden hose. Spring loaded pressure relief plates direct the water in various patterns that are formed above the rotating blade.

Another patent to Griffin, U.S. Pat. No. 3,214,893 issued Nov. 2, 1965 has a circular top-mounted hose bib that feeds a spaced equidistant plurality of jet fixtures which are located under the top of the carriage portion and above the rotating blade. In a Stabnau U.S. Pat. No. 2,992,524 issued Jul. 18, 1961, a single top-mounted hose bib connects to another jet/sprinkler unit also located above the blade. Again the water is directed above the blade and the purpose, according to Stabnau is to form a "fine mist, which is directed with great force and velocity within the housing." Applicant, however, forms a reduced cross section jet stream directed upward and from beneath the rotating blade tips in order to form a pulsating cleaning action not heretofor taught or suggested by the prior art.

Keating U.S. Pat. Nos. 3,813,190 and Lund 4,784,327 also relate to mowers and cleaning or pumping devices. These additional patents are cited only for completeness sake, since the above-described patents adequately set forth the state of the known art.

The inventor has determined that none of the known prior art provides a curved attachment with a depending slot in the upper edge allowing a novel cleaning attachment to be fitted to the skirt with a water passageway located solely below the slot termination, which passageway forms a jet stream that is directed upward and from beneath a rotating blade for an improved pulsating cleaning action. Entrance for hose-fed water is straight in at essentially a horizontal direction toward the mower housing, and is then angled upward as a jet stream of water into the blade tips proper for a pulsating cleaning action.

SUMMARY OF THE INVENTION

A cleaning attachment for a rotary lawn mower which has a rotating blade carried by a carriage with a vertically depending skirt that generally surrounds the blade is disclosed. The skirt, in standard fashion, terminates above the ground upon which the rotary mower sets and the skirt is used as an attachment point for the cleaning attachment of this invention. The cleaning attachment has a curved body member and includes a water passageway running through said body member from an outer to an inner surface thereof. A hose connection formed in the outer surface of said body member supplies water to the attachment device of this invention.

The cleaning attachment of the invention is distinguished from the prior art by locating the water passageway below the lowest edge of the skirt and that passageway provides the function of both reducing the size of the water passageway to form a jet stream of water and angling that jet stream upward from beneath into the tips of the mower's rotating blade. An unexpected result is achieved in that the rotating blades create a pulsating action that accomplishes improved mower cleaning. Indeed, forcing the jet stream from beneath the blade into the blade tip area supplies a new and improved cleaning action that is highly efficient and yet simple in operation.

The body member of this attachment invention is curved to fit a vast majority of most rotary mowers. The curved body member is provided with a curved vertical slot extending across the width of the upper portion of said body member. The curved slot terminates at about the midpoint of said body member so that the slot can readily receive the depending skirt of said carriage. A wing bolt allows the user to quickly install the cleaning attachment.

Locating the water passageway entirely below the point of termination of said slot provides a simple and efficient design having two interconnected water passages. Two embodiments are presented. In one embodiment, a water passage goes from a hose size to a reduced exit size by a smoothly graduated reduction. In the second embodiment, two reduced sized passages of uniform cross section are employed to develop the jet stream at a location beneath and directed upward into the tip area of the rotating mower blade.

The novel cleaning attachment of this invention includes a first upward-directed water passage selected at an angle of about thirty degrees, and terminating in an elliptically-shaped opening on the inner surface of said body member. This passage directs a jet stream of water exiting therefrom into and from beneath a rotating blade tip of the mower whereby the rotating blade cuts said jet stream and creates a pulsating cleaning action for the undercarriage, blade and skirt of said mower.

BRIEF DESCRIPTION OF THE DRAWINGS

For a further understanding of the invention, reference can be had to the following detailed description taken in connection with the accompanying drawing, in which:

FIG. 1 is a perspective view of a lawn mower cleaning attachment device showing the manner of design with a portion of the lawn mower being shown in phantom;

FIG. 2 is an elevation view of the device of FIG. 1;

FIG. 3 is a side elevation view of the device of FIG. 1;

FIG. 4 is a top plan view of the device of FIG. 1;

FIG. 5 is a bottom plan view of the device of FIG. 1;

FIG. 6 is a small perspective view of the cleaning attachment device of my invention with a large showing of a lawn mower to which the attachment device is connected.

DESCRIPTION OF THE PREFERRED EMBODIMENT

Figure 7:
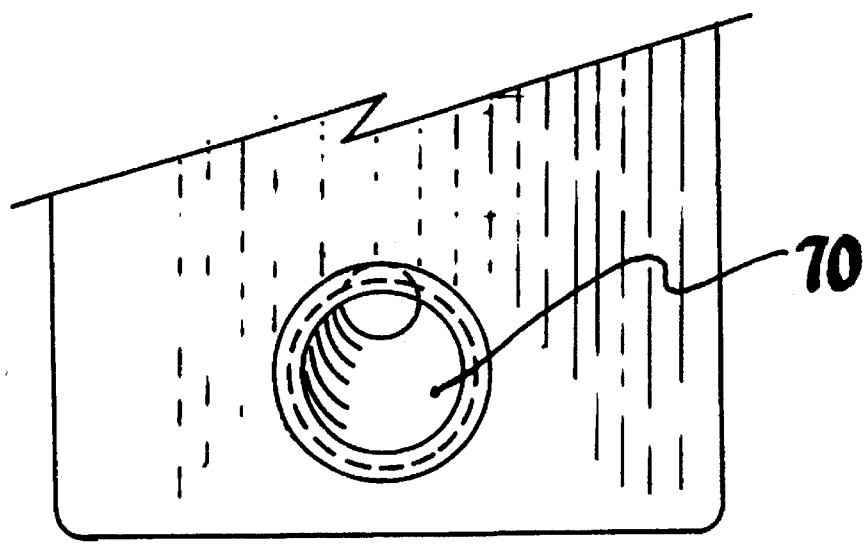
FIG. 7 is a partially cut away front plan view of the cleaning attachment device of FIG. 1 showing a straight hose feed on the outside to an angled reduction exit on the inside of the lawn mower skirt for the waterway for the device of FIG. 1.

Referring now to the drawing, FIG. 1 depicts a perspective view of the device 25 of my invention having a threaded female hose bib 26 for receiving a like threaded male coupler end 27 of hose 10 shown in dashed lines. Also shown in dashed lines in FIG. 1 is part of a lawn mower carriage 15 having a downward depending skirt 16.

The top edge of my device 25 includes a downward depending slot 30 which slot is slightly wider than the thickness of the skirt 16 and extends in depth about half way into the overall depth of the main body 40 of my device 25. FIG. 6 depicts, in dashed lines, the lawn mower device 8 and skirt 16 which receives cleaning attachment device 25 of this invention.

As more clearly shown in FIGS. 4 and 5, which are top and bottom views respectively of device 25, the inner side 32 of the main body section 40 is considerably thinner than the upstanding outer portion 33 of section 40. The general shape of the vertical portion 33 of body 40 is slightly curved in a convex manner. The outer upstanding rib 33 is stiff enough to securely hold a wing bolt 45. The width of slot 30 and the vertical convex curvature of body portion 40 is selected such that cleaning attachment device 25 of my invention fits a vast majority of most standard-sized rotary mowers of both push and/or rider types.

Such mowers, generally speaking, have curved carriage sides that can be accommodated by the above-described slot width and slight convex curvature for main body section 40. The side view of FIG. 3 depicts the convex curvature of the thin inner surface 32 and thicker outer upstanding rib 33 of body 40. Slot opening 30 is of consistent width throughout its horizontal dimension and allows the invention of device 25 to be attached to a mower carriage.

A threaded wing bolt 45 is fitted into a mated threaded opening 46 near the top outer edge of main body 40. The rear convex section does not include the opening 46 which allows the setting tip of wing nut 45 to press against the outer side surface of skirt 16 of carriage 15 when bolt 45 has been inserted into opening 46 and tightened in place by a user. This wing bolt 45 thus provides a quick and simple way of releasably attaching the device 25 to the mower 8.

Connected in the hose bib section 26 is a valve 55. Valve 55 is located in a cavity 52, and cavity 52 is positioned between the terminating end 27 of hose 10, when fully inserted into bib 26, and the beginning of a water passageway 70. A hose coupler end 26 is seated against an inner washer 71, FIG. 2, located at the beginning edge of cavity 52.

Valve 55 is thus located at an intermediate portion of waterway 70 in the main housing 40. Valve 55 is an ordinary shut-off valve of any suitable type. For example, valve 55 may be of the extruded plastic type in common use today on sprinklers and various watering devices as known in the art. Valve 55 rotates within cavity 52 and when rotated, provides, if necessary, an on/off valve at mower 8 for the cleaning attachment 25 of my invention. As an alternative, of course, the valve 55 may be dispensed with, and the user may simply turn the hose "on" or "off" at the house faucet (not shown). A second embodiment of my invention, as depicted in FIGS. 9 through 13, need not include a valve 55.

Figure 8:
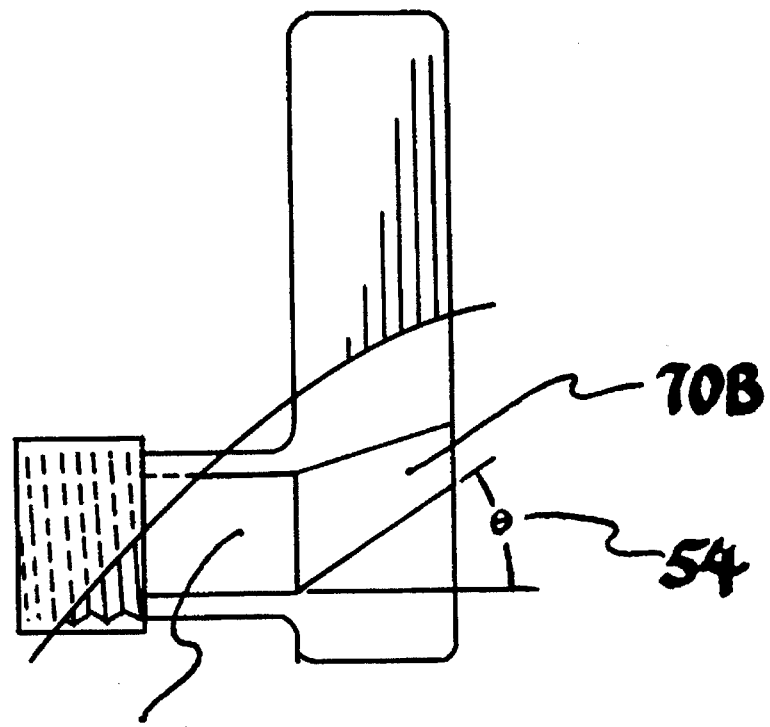
FIG. 8 is a partially cut away side elevation view of the water passageway for the device of FIG. 1.

FIG. 7 depicts a partial perspective front view similar to that of FIG. 2, except that a portion of valve 55 has been removed for clarity purposes. FIG. 7 (with the interior on/off valving stem of valve 55, removed) shows a smoothed gradually progressive throat reduction for water passageway 70 of my invention. FIG. 8 is a partial cutaway perspective ( similar to FIG. 3 ) and depicts water passageway 70 in more detail.

As shown in FIG. 8, hose-fed water from cavity 52 enters into main body portion 40 essentially in a horizontal, or "straight-in" manner. Such water is then directed upward at an angle, Ø, of about 25 to 45 degrees. As shown in FIG. 8, that angle is selected at about thirty degrees relative to the horizontal.

The angle, Ø, (numbered 54) has been selected relative to the bottom edge of skirt 16 so that hose water fed through cavity 52 will exit as a jet stream that is directed to the tip portions of the mower blade. Most blades have the end of the tips spaced a matter of about one-half inch or so away from the inner surface of the depending skirt of a mower carriage. Selecting angle 54 at about a thirty degree amount assures that the jet stream of water is angle-directed up and into the underside of carriage 15 such that the jet stream of water strikes a rotating mower blade near the blade tips.

The tip portions of a mower's rotating blade is primarily flat with a longitudinal edge curved slightly upward. That flattened blade surface and upward curvature, when spinning in the jet stream from device 25 of my invention, acts somewhat similar to a dishwasher, in that the blade spins, cuts and disperses the jet stream with sufficient force to clean the mower undercarriage, the blade, and related bearing and housing couplers, etc. The lawn mower cleaning attachment of my invention thus accomplishes a new and novel result in a simple, safe and efficient manner not heretofore thought possible in the art.

The invention has proven satisfactory when hose-supplied water under normal household pressure is entered at a level just below the lowest depending edge of skirt 16. Such water, as supplied through a normal garden hose, is thereafter both throttled down (or reduced) into a higher pressure jet stream and is angled upward against the tip portion of the mower blades. FIGS. 7 and 8 clarify that water entering from a hose of about three-quarters inch inner diameter enters through the valved cavity 52 and is then directed upwardly through housing 40.

Several different passageways 70 have been tested and the invention reveals that a reduction from a diameter of about three quarters to about a diameter of three eights of an inch provides sufficient jet stream pressure to do an efficient cleaning job on the carriage and blade of a mower.

Figure 9:
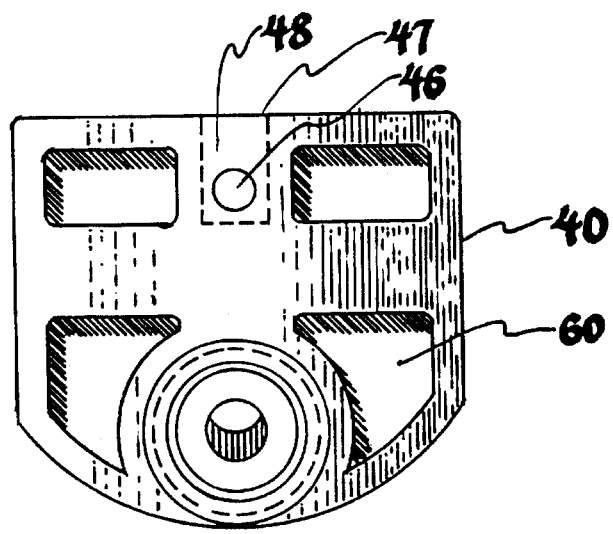
FIG. 9 is a front plan view of another embodiment of the cleaning attachment device of my invention.
Figure 10:
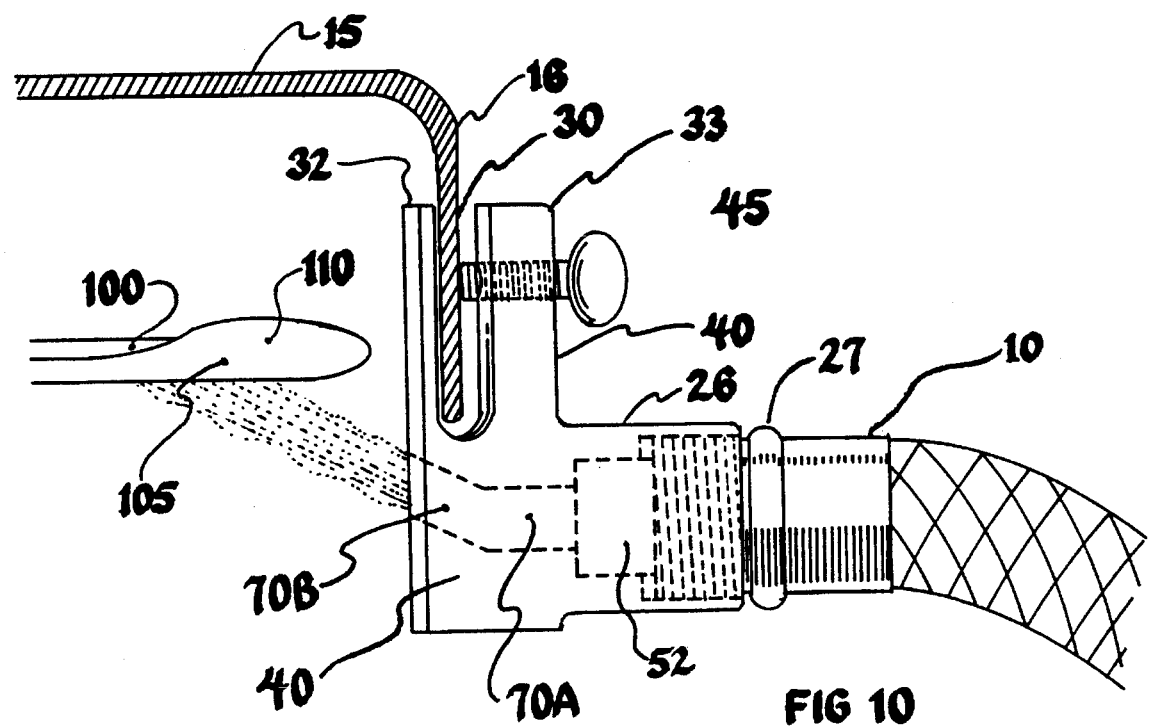
FIG. 10 is a partially cut away side elevation view of the device of FIG. 9 and shows diagrammatically the jet stream striking a mower blade from beneath and at an angle.

A second embodiment of my cleaning attachment invention 25 is shown in FIGS. 9 through 13. This second embodiment also has an outward convex curvature that is somewhat more shallow than the curvature of the first embodiment of FIGS. 1 through 8. FIG. 9 is totally manufactured of extruded plastic and depicts a smoother and more narrow profile design for main body 40. The entrance coupler, or hose bib 26, in this embodiment is integral with main body portion 40 and is simply a threaded hollow circular cylinder with a hose stop partition for receiving a hose washer and the male end 27 of hose 10 all as depicted in FIG. 10.

In this alternative embodiment, cavity 52 need not contain any valving arrangement such as valve 55 described earlier and seated within cavity 52 for FIGS. 1 through 8. As shown in the front, side and rear views of FIGS. 9, 10, and 11, respectively, the water passageway 70 again reduces, or throttles, down from about ¾ inch to about ⅜ inch for the reasons described earlier.

In this alternative embodiment, as clearly shown in the side view of FIG. 10, the main body portion 40 includes a water passageway having water passages 70A and 70B which are located entirely below the bottom of slot 30. Both of these passages are about ⅜ of an inch in diameter, and in this embodiment are straight intersecting bores of uniform cross section. Bore 70B is at angle 54 (which angle may be selected between about 25 to about 45 degrees relative to the horizontal.) Bore 70A is horizontal, 70B is upward at about thirty degrees, and both bores intersect at about the middle of the thickness, or depth, of body 40.

Slot 30 is again used and designed as described earlier for the first embodiment of my lawn mower cleaning attachment invention 25 to receive skirt 16, FIG. 10. A centered and recessed slot 47, FIG. 9, is adapted to receive a square threaded nut 48. Nut 48, when inserted in slot 47, is located at the center of the bore 46 and has threads mated with a wing bolt 45. Nut 48 securely locks housing 40 to the downward depending skirt 16 of a mower carriage.

In this embodiment, as best shown in the side view of FIG. 10, the mower blade 100 at its tip has both a flat blade surface 105 for cutting and an upward curved flap edge 110. As described earlier, the angled bore 70B directs a jet stream of water 125 into this tip portion of blade 100. As blade 100 rotates, the jet stream 125 is dispersed and thoroughly performs a pulsating cleansing action on the underside of the carriage and the blade 100.

It should again be noted that the attachment device does not require any modification to existing mower configurations. Water from an ordinary garden hose is brought into the carriage area under the lowest edge of the skirt 16 and through a new and novel reduction and angled waterway principle performs a pulsating cleaning function in a manner not heretofore suggested by the prior art.

Figure 11:
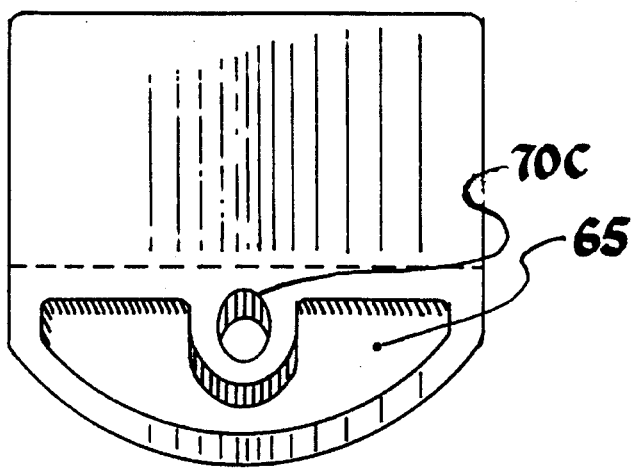
FIG. 11 is a rear view of the embodiment of FIG. 9.
Figure 12:
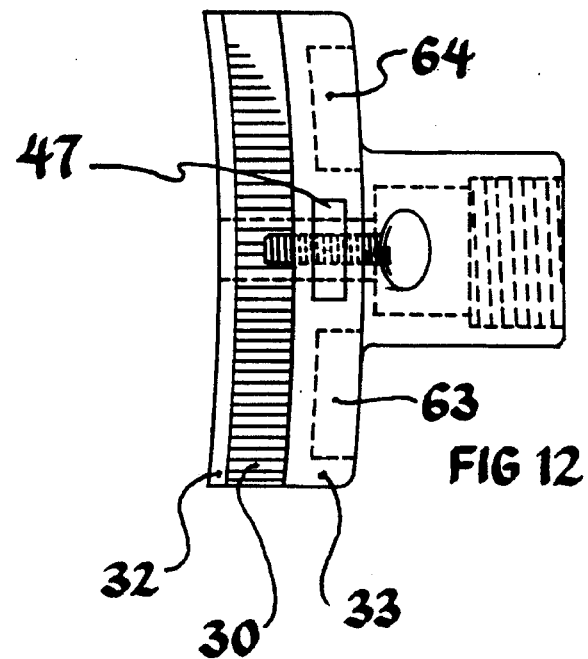
FIG. 12 is a top plan view of the embodiment of FIG. 9.
Figure 13:
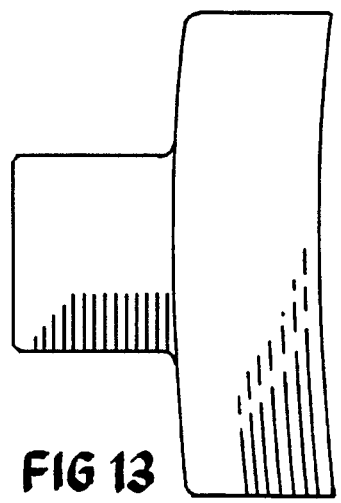
FIG. 13 is a bottom plan view of the device of FIG. 9.

FIG. 11 includes a view of the exit opening 70C of waterway 70. That opening being at the angle, Ø, appears as an ellipse in the view of FIG. 11. Each of the views include recessed portions such as the crescent shaped recesses 60 and 61 and the rectangular recesses 63 and 64, FIG. 12. Another crescent shaped recess 65, as best shown in FIG. 11, is provided in the lower rearward section of body portion 40. FIG. 12 depicts the relative thickness of front rib 33 and the rear rib 32 forming slot 30.

Also clearly shown in FIG. 12 is a radius of curvature for the convex outer shape of body portion 40. That radius of curvature is selected to be about 10 to 15 12 to 13 inches. My research has shown that such a curvature radius, together with a slot width of about ⅜ of an inch, permits my attachment invention to universally fit almost all smaller existing rotary mowers of the push and/or riding types, the attachment is done simply and quickly without user concern for the diverse manufacturing specifications of differing mower types.

The above described recess portions 60, 61, 63, 64, and 65 reduce the amount of material that is required to manufacture the device. Similarly the rounded curvature at the bottom of the embodiment of FIGS. 9 through 13 provides a low profile and less material than the embodiment of FIGS. 1 through 8. Thus, the extruded attachment device 25 of this my invention, when made entirely from extruded plastic— except for the nut and wing bolts 45 and 47— requires a reduced volume of material and yet exhibits a high amount of structural integrity. This attachment device is thus easy to install and/or remove and is both light weight and economical in operation.

While various changes may be made in the detail construction, it shall be understood that such changes will be within the spirit and scope of the present invention as defined by the appended claims.

What is claimed is:

1. A cleaning attachment for a rotary lawn mower having a rotating blade carried by a carriage which has a curved vertically depending skirt generally surrounding the blade and terminating above the surface upon which the rotary mower sets, said cleaning attachment comprising:

a body member having a vertical slot in an upper portion of said body member, with said slot terminating at about the midpoint of said body member, and said slot being adapted to receive said depending skirt of said carriage therein;

a water passageway running from an outer to an inner surface of said body member, with said passageway being entirely located below the point of termination of said slot;

said water passageway having a first essentially horizontal passage in fluid communication with a second passage angled upward at an angle selected from about twenty-five to about forty-five degrees to the horizontal;

a hose connection formed in said outward facing surface of said body member for defining in the body member a water cavity adapted to receive water delivered to said attachment by said hose and communicating said water with said horizontal passageway; and said angled passage reduced in size relative to said horizontal passage for forming water from said hose into a jet stream, with said upward angled passage having an exit port on said inner surface of said body portion for directing said jet stream from beneath and into the tip of said rotating blade.

2. A cleaning attachment in accordance with claim 1 and further comprising:

a thin upstanding rib of said body portion defined by said slot, with said thin rib being located on the inside of said skirt between the outer edge of said blade and the inner surface of said skirt; and said thin upstanding rib having a smooth planar inner surface with an exit opening therein facing upward and toward the rotating blade when said attachment is connected on the skirt of said mower carriage.

3. A cleaning attachment in accordance with claim 2 and further comprising:

a thicker upstanding rib of said body portion defined by said slot, with said thicker portion being positioned for location on the outside of said skirt with said skirt seated in said slot between the thin inner rib and the thicker outer rib; and threaded means located in the upper center of said thicker outer rib for releasably fastening said attachment to said skirt with the lowest edge of said skirt being seated in the slot defined between said two upstanding ribs.

4. A cleaning attachment in accordance with claim 3 and wherein said water passageway further comprises:

a larger bore forming a first hose-sized cavity on the outer surface of said body portion at a location below the slot bottom; and a smooth throat passage gradually reducing said hose-sized bore down to a jet stream exit of about three-eights of an inch in diameter.

5. A cleaning attachment in accordance with claim 3 wherein said upward angle of said water passageway further develops a pulsating cleaning action for said attachment when attached to a mower having water fed into the hose-sized cavity, said attachment further comprising:

an upward-directed bore means of uniform cross section in said angled water passage, with said bore means selected at an angle of about thirty degrees and terminating in an elliptically-shaped opening on the inner surface of said body member;

said bore means directing a jet stream of water exiting therefrom into and from beneath a rotating blade tip of the blade of said mower whereby the rotating blade cuts said jet stream and creates said pulsating cleaning action for the undercarriage, blade and skirt of said mower.

6. A cleaning attachment in accordance with claim 5 wherein said cavity further comprises:

an on/off valve means positioned in said cavity for turning the hose-fed water either on or off at said attachment location.

7. A cleaning attachment in accordance with claim 3 wherein said threaded means further comprises:

a threaded wing bolt in said outer rib for applying pressure against said skirt to hold said cleaning attachment to said skirt during said cleaning operation.

8. A cleaning attachment in accordance with claim 1 wherein said body portion of said cleaning attachment is curved with a given outside convex curvature and further comprises:

a radius of curvature for said slot in said body portion which receives said outer convex body portion of said mower skirt.

9. A method of cleaning a rotary lawn mower having a rotating blade carried by a carriage, which carriage has a vertically depending skirt generally surrounding the blade, said cleaning method comprising:

connecting to said vertical skirt, without requiring any modification to said carriage and/or said skirt, a cleaning attachment having a body portion with a water passageway therein;

positioning said attachment so that the water passageway therein is below the lowest edge of said skirt and runs from the outside surface of said body portion to the inner surface thereof;

feeding water from a hose into said water passageway of said cleaning attachment;

directing water fed from said hose into said water passageway and through said body portion of said attachment essentially in a horizontal manner from the outside of said attachment into the body portion and under the lowest edge of the carriage skirt;

angling the water upwardly through a nozzle in said body portion, which nozzle is positioned at an angle, $\Phi$, of about 25 to 45 degrees to the horizontal and has an exit opening on the inner surface of said body member located on the inside of said skirt;

reducing the size of said water passageway in said cleaning attachment from about hose size at the outer water entrance of the body portion to a considerably smaller exit size on the inside of said body portion;

forming an upwardly-directed jet stream of water by said reduction in size and selected angle for said water passageway in said body portion;

facing the inside exit opening from beneath and upward toward the rotating blade tips of said mower;

directing said formed jet stream from beneath and against the tip portions of the mower blade such that said jet stream strikes the rotating mower blade at or near the blade tips; and forming a pulsating cleaning action for the underside of said carriage, blade and skirt by cutting said jet stream with said rotating blade tips.

10. The method of cleaning a rotary lawn mower in accordance with claim 9 wherein said tip portions of a mower's rotating blade are primarily flat with a longitudinal blade edge curved slightly upward, and said method further comprises;

spinning that flattened blade surface with its upward curvature in the jet stream in order to cut and disperse the jet stream with sufficient pulsating force to clean the mower undercarriage, the blade, and related bearing and housing couplers and the like.

11. A cleaning method in accordance with claim 10 wherein the outer tip ends of the rotary mower blade normally clear the inner surface of the skirt by a matter of about one-half to about three-quarters of an inch, and said method further comprises the steps of:

selecting the angle, Ø, at about thirty degrees relative to the horizontal in order to direct the water jet stream upward into the blade at or near the tip ends at said selected angle.

12. A cleaning attachment for a rotary lawn mower having a rotating blade carried by a carriage which has a generally curved vertically depending skirt surrounding the blade and terminating above the surface for said rotary mower, said cleaning attachment having a body member which includes a water passageway running through said body member from an outer to an inner surface thereof, a hose connection formed in said outer surface of said body member, and a hose-sized water cavity defined in the body member, which cavity is adapted to receive water delivered to said attachment by said hose, and said cleaning attachment is characterized by comprising:

said body member having a vertical slot extending across the width of and located in an upper portion of said body member, with said curved slot terminating at about the midpoint of said body member, with said slot being adapted to receive said depending skirt of said carriage therein;

a fastening means for releasably fastening said attachment to said depending skirt;

said water passageway being located entirely below the point of termination of said slot and having a first essentially horizontal passage from said hose connection point and in fluid communication with a second passage angled upward at an angle selected at about thirty degrees to the horizontal; and both said horizontal and angled water passages in said passageway reduced in size relative to said hose-sized input for forming water from said hose into a jet stream, with said upward angled passageway having an exit port on said innermost surface of said body portion in order to direct said jet stream into the tip of said rotating blade.

13. A cleaning attachment in accordance with claim 12 wherein said upward angle of said water passageway develops a pulsating cleaning action for said attachment when attached to a mower having water fed into the hose-sized cavity, and said attachment further comprises:

a first upward-directed water passage of uniform cross section in said water passageway, with said first passage selected at an angle of about thirty degrees and terminating in an elliptically-shaped opening on the innermost surface of said body member; and said first passage directing a jet stream of water exiting therefrom into and from beneath a rotating blade tip of the blade of said mower whereby the rotating blade cuts said jet stream and creates said pulsating cleaning action for the undercarriage, blade and skirt of said mower.

14. A cleaning attachment in accordance with claim 13 wherein said water passageway further comprises:

a second horizontal water passage of the same uniform cross section as said first passage, with said first and second passages connected together to form said passageway from said hose-fed water inlet to said jet stream water exit.

15. A cleaning attachment in accordance with claim 12 wherein said slot in said body portion of said cleaning attachment essentially matches the shape of the skirt curvature, and further comprises:

said slot of said body portion having a width selected to accommodate mower skirts in a range of about ten to fifteen inches of radius curvature for the skirt shape.

* * * * *